United States Patent [19]

Moreton

[11] 4,352,038

[45] Sep. 28, 1982

[54] ACOUSTICAL TRANSMISSION WAVE GUIDE ASSEMBLY FOR PREDICTING FAILURE OF STRUCTURED MEMBERS

[76] Inventor: Neal S. Moreton, R.D. 5, Box 292, East Stroudsburg, Pa. 18301

[21] Appl. No.: 122,044

[22] Filed: Feb. 19, 1980

[51] Int. Cl.³ .............................................. H01L 41/08
[52] U.S. Cl. ................................. 310/323; 310/336; 310/334; 73/587; 73/649; 73/661
[58] Field of Search .................. 310/26, 328, 334, 336, 310/323, 325; 73/587, 649, 661

[56] References Cited

U.S. PATENT DOCUMENTS

| | | | |
|---|---|---|---|
| 3,027,690 | 4/1962 | Roney | 310/26 X |
| 3,210,724 | 10/1965 | Jones et al. | 310/26 X |
| 3,569,748 | 3/1971 | Minchenko | 310/323 |
| 3,777,189 | 12/1973 | Skinner et al. | 310/26 X |
| 4,131,815 | 12/1978 | Boatright | 310/323 |

*Primary Examiner*—Mark O. Budd
*Attorney, Agent, or Firm*—Shlesinger, Arkwright, Garvey & Dinsmore

[57] ABSTRACT

A metallic wave guide having a smooth protected surface is connected at one end to a metal structural member under test and at the other to a metal plate to which a piezo electric crystal transducer of preselected frequency response is attached. The lengths of primary and secondary wave guides are carefully selected to control attenuation and time delay of the acoustical energy transmitted along the wave guides to balance inputs and provide repeatable testing data.

12 Claims, 8 Drawing Figures

ACOUSTICAL TRANSMISSION WAVE GUIDE ASSEMBLY FOR PREDICTING FAILURE OF STRUCTURED MEMBERS

This invention relates to a new type of an acoustical wave guide and a method of using such device to evaluate the acoustical emission from a metal structural member to predict its imminent failure.

It has been found that metal structural members on approaching failure produce high energy acoustical frequency waves, apparently caused on slippage and fracture of the metal along crystal shear planes. It has been possible to detect the acoustical energy emitted on slippage by applying directly to the member under test a frequency responsive piezo electric crystal transducer and then measure the output of the piezo electric crystal to determine whether slippage and stress is occurring. Testing was usually conducted under direct load with testing measurements being taken at that time.

The drawback to this system is that tests could only be run under controlled conditions and that there was no ability to conduct such tests on a continuous basis, either because of the inaccessibility of the members under test, or the fragileness of the detecting elements.

Further, heretofore, there had been no ability to determine with any degree of predictability whether the sound energy of this type indicated a possibility of imminent failure of a structural member.

SUMMARY AND FEATURES OF INVENTION

Accordingly, it is a principal feature of this invention to provide a new type of wave guide and a method of producing a predictable indication of whether failure is about to occur in a structural member.

Another feature of this invention is the providing of a method of predicting potential failure in a member under load and when in ordinary regular use.

A further feature of this invention is to provide a new type of acoustical wave guide which will transmit acoustical frequencies emitted by a structural member when slippage begins to occur between crystal planes and portions of a metal structural member.

A further feature of this invention is the providing of a rugged wave guide which can be kept in position to provide continual testing capability of a structural member during the course of its day-do-day use without concern for its damage or impairment of operation.

A still further feature of this invention is the providing of a predictable monitoring system for members of structures to warn of future failure of key elements of the structure due to overload or other factors.

Another feature of this invention is the use of the new wave guide to provide improved testing procedures which will give reliable data for predicting the approach of catastrophic failure of a member, due to cumulative incipient failure within the member.

A still further feature of this invention is the providing of a wave guide system which eliminates need for multiple and expensive piezo electric transducers at every monitoring point.

These and further features of this invention will be apparent from the following description and claims.

DESCRIPTION OF THE INVENTION

Figure 1:
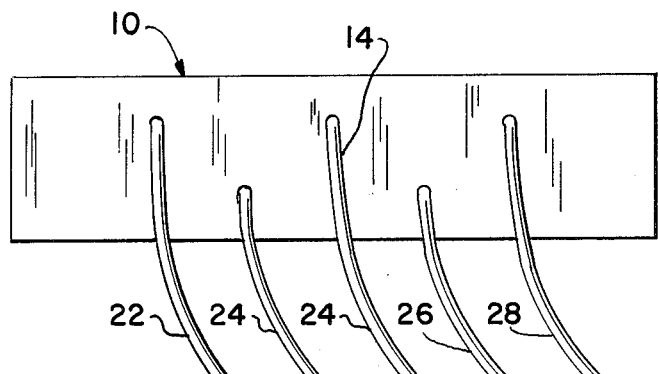
FIG. 1 shows a test piece with the system attached thereto.
Figure 2:
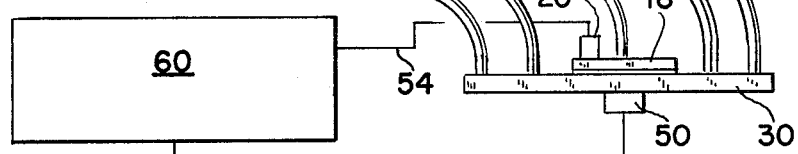
FIG. 2 is a diagrammatic showing of the placement of the wave guides of FIG. 1.

Referring to FIGS. 1 and 2 the test piece 10 has a plurality of wave guide members attached thereto for monitoring the acoustical noise transmitted through the member. They are arranged in a particular manner to obtain readings of acoustical emissions emitted by the slippage and fracture, while eliminating extraneous noise from other sources.

In FIG. 2, the arrangement of the wave guides on the test piece 10 is shown. The primary contact points of the wave guide are positioned in the area 12 in which the failure or crack is most likely to occur as shown at 16. The other end of the wave guide is located on the pickup plate 18, shown in FIG. 1, and the acoustical noise is then transmitted through the crystal pickup 20 which is directly applied to the sensing plate 18 to pick up acoustical energy. The piezo electric crystal transducer is sensitive to frequencies of about 200 kilohertz. This frequency response value is selected to avoid audio noises which are in the 100 kilohertz or lower frequency range, as well as to avoid the high range noise of 500 kilohertz or more that might be produced by radio communication. Acoustical emission due to fracture comes in high energy short bursts which will ring the crystal, and these activations of the crystal are measured and picked up by the instrumentation.

Secondary wave guides 22, 24, 26 and 28 are connected to the secondary sensing plate 30. FIG. 2 diagramatically illustrates the arrangement of the contact points where the ends of these wave guides are attached to the plate surrounding the area of principal failure 12, as shown at 32, 34, 36 and 38. These wave guides are arranged along a protective line, generally indicated at 40, to pick up and act as a screen for other acoustical emissions traveling through the member which are not emanating from the area of principal failure 12.

Figure 3:
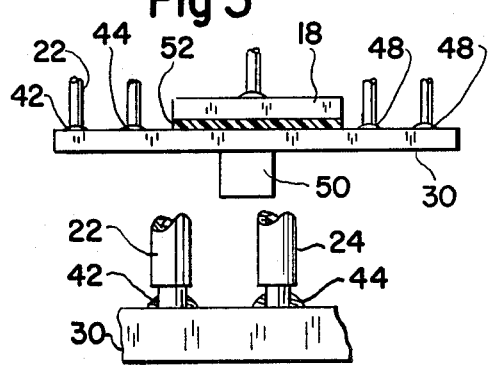
FIG. 3 is an end view of the acoustic plate assembly of FIG. 1.

The acoustical pickup assembly of FIG. 1 is shown in greater detail in FIG. 3. Sensing plate 18 to which the principal wave guide 14 is attached is mounted on the secondary pickup sensing plate 30 to which the secondary wave guides are attached as shown at 42, 44, 46 and 48. Secondary sensing plate crystal 50 is attached to the plate, providing the ability to pick up, with only one crystal, the acoustical outputs from multiple testing points, (as in this case, points 32, 34, 36, and 38). It should be noted that the principal sensing plate is mounted on secondary sensing plate 30 and separated therefrom by an insulating layer or member 52, which can be a piece of plastic, rubber or other acoustical insulating material which will isolate the principal acoustical signals from the secondary acoustical signals.

Figure 4:
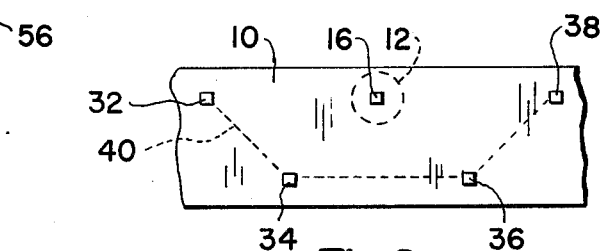
FIG. 4 is an enlarged view of a portion of FIG. 3.

FIG. 4 is an enlarged view of FIG. 3 showing the wave guides 22 and 24 in greater detail, and the manner of attachment of the wave guides to the plate 30. The ends of the wave guide are preferably welded at 42 and 44 to the plate 30 to provide a solid and rugged attachment to the plate which will not impair transmission of acoustical energy. However, it may be possible to use resin to attach the wave guides.

The acoustical impulses are transmitted along lines 54 and 56 from the piezo electric pickups 20 and 50 to the electrical detection apparatus 60.

Figure 5:
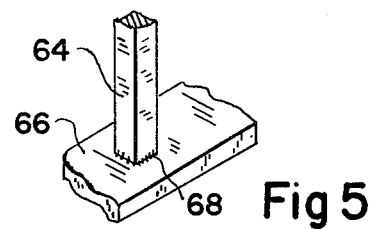
FIG. 5 is a perspective view showing a wave guide as attached to a piece under test.

In FIG. 5 the wave guide 64 is shown in position on plate 66, held thereto by a weld or resin 68 in abutting relationship with the plate 66. The wave guides are elongated pieces of square cross-sectioned carbon steel stock of approximately one quarter inch width. It has been found that these wave guides, which are solid, transmit the acoustical signals along the surfaces for as much as thirty feet with only a small amount of loss, providing the external surfaces are smooth and free from scratches. As long as there is solid contact with the plate, and a good weld, the acoustical waves travel along the surface of the piece 66 as well as the surfaces of the wave guide 64 without appreciable loss at the juncture of the two members.

Figures 6, 7, 8:
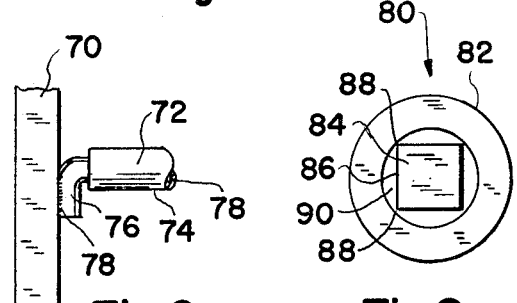
FIG. 6 is another view of another manner of attaching the wave guide to a piece under test.
FIG. 7 is a perspective view of a preferred construction of the wave guide members.
FIG. 8 is an end view of the wave guide of FIG. 7.

Another means of fastening the wave guide is shown in FIG. 6, in which the member 70 is under test. The wave guide generally indicated at 72 has an external protective sleeve 74. The wave guide is square cross-sectioned and has an end section 76 approximately three quarters of an inch long, bent at right angles to the wave guide, generally, and welded to the plate at 78.

FIGS. 7 and 8 disclose the construction of the wave guide itself. The wave guide generally indicated at 80 has a circular plastic protective sleeve 82 which is slipped over the entire length of wave guide 84. The plastic sleeve prevents damage to the surface of the wave guide and also shields the surface from possibility of being struck by foreign objects which would scratch it or induce noise which would interfere with the signals transmitted along the wave guide surface.

In FIG. 8 it will be noted that the surface 86 contacts the inner periphery of the protective plastic sleeve 82 at its corners 88 leaving a clearance space 90 between its internal surface and the surface 86, along which the acoustical waves are transmitted.

It should be noted that at both ends of the wave guides, the ends of the wave guide are fastened, as by welding, to both the test piece at the location desired, and to its respective sensing plate. It is important that there should be a good firm connection along which the acoustical waves can travel.

What I claim is:

1. An acoustical transmission wave guide assembly for detecting acoustical energy emitted by structural members under adverse stress conditions, comprising:
   (a) a thin elongated metal wave guide having a smooth uninterrupted surface free from scratches along which such acoustical energy may travel,
   (b) a member having a monitored surface along which acoustic energy emitted by crystal slippage under adverse stress conditions is carried,
   (c) one end of the wave guide being rigidly connected to the monitored surface so as to permit the acoustical energy to pass from the monitored surface to the smooth surface of the wave guide along which it travels,
   (d) the other end of the wave guide being rigidly attached to a sensing plate such that the acoustical energy carried along the smooth surface of the wave guide is received,
   (e) a piezo electric transducer sensitive to such acoustical energy frequencies being attached to the sensing plate, and
   (f) protecting means disposed around and spaced from the wave guide transmitting surface to preclude damage to the surface and introduction of spurious acoustical impulses.

2. The acoustical transmission wave guide assembly as set forth in claim 1, wherein:
   (a) the wave guide has a rectangular cross section.

3. The acoustical transmission wave guide assembly as set forth in claim 2, wherein:
   (a) the wave guide is an elongated piece of metal material of approximately one-sixteenth, to one-half inch width along its smooth uninterrupted surface.

4. The acoustical transmission wave guide assembly of claim 2, wherein:
   (a) the elongated metal wave guide is of rectangular cross section, and
   (b) the protecting means is a protective sleeve extending the length of the wave guide and engaging the corners thereof.

5. The acoustical transmission wave guide assembly as set forth in claim 1, wherein:
   (a) the piezo electric transducer operates at frequencies greater than a hundred and less than five hundred kilohertz.

6. The acoustical transmission wave guide assembly as set forth in claim 1, wherein:
   (a) the wave guide is welded to the monitored surface, and to the sensing plate to hold it firmly in contact.

7. An acoustical transmission wave guide assembly for detecting acoustical energy emitted by structural members under adverse stress conditions, comprising:
   (a) a member having a monitored surface along which the acoustical energy travels,
   (b) a primary wave guide having a smooth uninterrupted surface free from scratches along which such acoustical energy is carried, and which is a long thin metal rod.
   (c) one end of the primary wave guide rigidly connected to the monitored surface and positioned at a point where the acoustical energy may be expected at the anticipated failure area,
   (d) the other end of the primary wave guide being rigidly attached to a sensing plate.
   (e) a primary piezo electric transducer sensitive to such acoustic energy which is attached to the sensing plate,
   (f) at least one secondary acoustical wave guide similar in construction to the primary wave guide which is fixed to the monitored surface between the point of attachment of the primary wave guide and a position where spurious acoustical waves may be expected,
   (g) the other end of the secondary wave guide attached to a secondary sensing plate,
   (h) a secondary piezo electric transducer sensitive to such acoustical energy attached to the sensing plate, and
   (i) electrical detection means connected to the output of both the primary and secondary piezo electric transducers for receiving the acoustical outputs therefrom.

8. The acoustical transmission wave guide assembly as set forth in claim 7, wherein:

(a) there are a plurality of secondary wave guides all of which are connected to the secondary sensing plate.

9. The acoustical transmission wave guide assembly as set forth in claim 8, wherein:
(a) the secondary wave guides are disposed in contact with the monitored surface in an arc about the primary wave guide.

10. The acoustical transmission wave guide assembly as set forth in claim 7, wherein:
(a) the wave guides are square cross-sectioned rods having faces with a dimension of one-sixteenth to one-half inch.

11. The acoustical transmission wave guide assembly as set forth in claim 7, wherein:
(a) the primary piezo electric transducer and the secondary electric transducer have an operating range of greater than one hundred kilohertz and less than five hundred kilohertz.

12. The acoustical transmission wave guide assembly as set forth in claim 7, 8, 9 or 10, wherein:
(a) the wave guides are square cross-sectioned rods having faces with a dimension of one-sixteenth to one-half inch, and
(b) the primary piezo electric transducer and the secondary electric transducer have an operating range of greater than one hundred kilohertz and less than five hundred kilohertz.

* * * * *